United States Patent [19]

Horigome et al.

[11] 4,234,438
[45] Nov. 18, 1980

[54] MAGNETIC RECORDING MEDIUM

[75] Inventors: Eiji Horigome; Hiroshi Ota; Hitoshi Azegami, all of Tokyo, Japan

[73] Assignee: TDK Electronics Company Limited, Tokyo, Japan

[21] Appl. No.: 37,779

[22] Filed: May 10, 1979

[30] Foreign Application Priority Data

May 18, 1978 [JP] Japan ................... 53/58299

[51] Int. Cl.³ .................. H01F 1/373; B05D 5/12
[52] U.S. Cl. .................. 252/62.54; 427/128
[58] Field of Search .............. 252/62.54; 427/128

[56] References Cited

U.S. PATENT DOCUMENTS

| 3,810,840 | 5/1974 | VanRuler et al. | 252/62.54 |
| 3,824,128 | 7/1974 | Akashi et al. | 252/62.54 X |
| 4,020,236 | 4/1977 | Aonuma et al. | 428/457 |
| 4,066,564 | 1/1978 | Sasazawa et al. | 252/62.56 |
| 4,135,031 | 1/1979 | Akashi et al. | 428/323 |
| 4,152,485 | 5/1979 | Mizumura et al. | 428/425 |

Primary Examiner—F. C. Edmundson
Attorney, Agent, or Firm—Oblon, Fisher, Spivak, McClelland & Maier

[57] ABSTRACT

A magnetic recording medium comprises a substrate coated with a magnetic coating composition comprising nitrocellulose impregnated with a vinyl chloride-vinyl acetate-vinyl alcohol copolymer having a content of vinyl alcohol component of 8 wt. % or more, a magnetic powder, a solvent, and a thermal crosslinking agent.

6 Claims, 2 Drawing Figures

4,234,438

MAGNETIC RECORDING MEDIUM

BACKGROUND OF THE INVENTION

1. Field of the Invention

The present invention relates to an improvement of a magnetic coating composition used for preparing a magnetic recording medium.

2. Description of the Prior Arts

Magnetic coating compositions for a magnetic recording medium are classified into thermoplastic resin type compositions and thermosettable resin compositions.

A magnetic recording medium prepared by coating a magnetic coating composition obtained by using a thermosettable resin binder as at least one portion, on a substrate such as a polyester film, has advantages such as excellent smoothness of the surface and excellent gloss degree and high abrasive resistance. However, the thermosettable binder is crosslinked with a high reactive crosslinking agent, whereby it has serious disadvantages such as a short pot-life.

In order to overcome the difficulty, the inventors have studied the use of nitrocellulose, and thereby the desired results have been obtained.

SUMMARY OF THE INVENTION

It is an object of the present invention to provide a magnetic recording medium having excellent dispersibility of magnetic powder excellent gloss degree and excellent electric characteristics.

It is another object of the present invention to provide a magnetic recording medium having excellent smoothness and excellent abrasive resistance.

It is the other object of the present invention to provide a magnetic coating composition having the long pot-life.

The foregoing and other objects of the present invention have been attained by providing a magnetic coating composition prepared by separating a plasticizer of an alcohol from a nitrocellulose composition and impregnating a vinyl chloride-vinyl acetate-vinyl alcohol copolymer having a content of vinyl alcohol component of more than 8 wt.% into nitrocellulose and then, blending a magnetic powder and a solvent to the resulting nitrocellulose impregnated with the vinyl chloride-vinyl acetate-vinyl alcohol copolymer having a content of vinyl alcohol component of more than 8 wt.%, and adding a crosslinking agent and a magnetic recording medium prepared by coating the same.

DETAILED DESCRIPTION OF THE PREFERRED EMBODIMENTS

Figure 1:
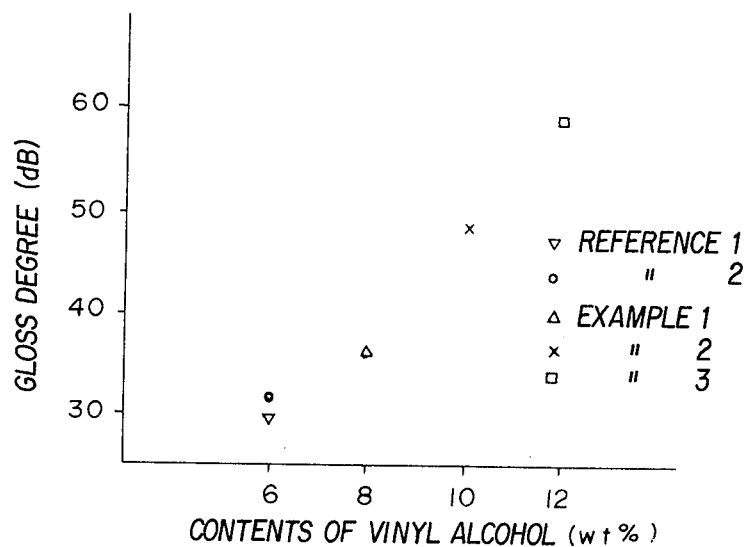
FIG. 1 is a graph showing the relation of contents of vinyl alcohol components and gloss degree.

A pot-life of a magnetic coating composition can be improved and a magnetic recording medium having excellent gloss degree and excellent sensitivity can be obtained by incorporating nitrocellulose (which is non-miscible) into a thermosettable binder comprising a polymerizable polyurethane and a vinyl chloride-vinyl acetate-vinyl alcohol copolymer (which are crosslinked with a crosslinking agent of polyisocyanate) (which are miscible). The magnetic coating composition can be used for a long time after blending the crosslinking agent.

However, the handling of nitrocellulose composition is not easy. The special care is required for handling nitrocellulose composition. When non-impregnated nitrocellulose is handled, it may cause firing etc. Thus, nitrocellulose is impregnated with a solvent such as isopropyl alcohol. However, when the nitrocellulose impregnated with an alcohol such as isopropyl alcohol is mixed with the other components to prepare a magnetic coating composition, the alcohol reacts with the thermal crosslinking agent such as polyisocyanate whereby the reaction of the thermal crosslinking agent with the polyurethane is not satisfactory. When the magnetic coating composition is used for a preparation of a magnetic recording tape, a characteristic of the magnetic recording tape in its running is inferior.

The inventors have studied on the preparation of magnetic recording media by using nitrocellulose and a vinyl chloride-vinyl acetate-vinyl alcohol copolymer such as VAGH manufactured by Union Carbide Co. in U.S.A. or nitrocellulose impregnated with a vinyl chloride-vinyl acetate-vinyl alcohol copolymer. However, when a content of vinyl alcohol component is low, OH groups in the copolymer are not enough whereby dispersibility of the magnetic powder is not satisfactory and the reaction of the copolymer with NCO groups of the thermal crosslinking agent is not satisfactory.

In the present invention, a vinyl chloride-vinyl acetate-vinyl alcohol copolymer having a content of vinyl alcohol component of 8 wt.% or more preferably 8 to 30 wt.% especially 8 to 20 wt.% is impregnated into nitrocellulose after removing the solvent isopropyl alcohol, and the nitrocellulose impregnated with said copolymer is blended to the other components such as the magnetic powder, solvents and the other polymer whereby dispersibility of the magnetic powder is improved and a magnetic recording medium having excellent gloss degree and excellent electric characteristics can be obtained.

A ratio of nitrocellulose to a total of the vinyl chloride-vinyl acetate-vinyl alcohol copolymer and nitrocellulose is preferably in a range of 0.05 to 0.8 especially 0.2 to 0.8 by weight.

It is quite important and distinguished from our former invention that the nitrocellulose impregnated with the specific vinyl chloride-vinyl acetate-vinyl alcohol copolymer (content of vinyl alcohol component more than 8 wt.%) is blended to the magnetic powder and the solvent. It is quite different from the former invention nitrocellulose impregnated with isopropyl alcohol is blended to the vinyl chloride-vinyl acetate-vinyl alcohol copolymer, the magnetic powder and the solvent.

The magnetic powder can be any one which can be used for a preparation of a magnetic recording medium. These magnetic powder is well-known in the art and accordingly, the examples of the magnetic powder are not recited in this specification.

The solvent can be any one which can be used for the preparation of a magnetic recording medium. These solvents are selected depending upon kinds of the polymers and well-known in the art and accordingly, the examples of the solvent are not recited.

The nitrocellulose impregnated with the vinyl chloride-vinyl acetate-vinyl alcohol copolymer can be blended with the other polymer such as a polyester, a polyurethane and others.

A polyurethane is preferably incorporated in the magnetic coating composition and can be selected from the conventional linear polyurethanes which are reaction products of isocyanate and polyurethane.

A thermal crosslinking agent is added to the mixture of the nitrocellulose impregnated with the special copolymer, the other polymer. The thermal crosslinking agent can be any one and preferably, a polyisocyanate which reacts with OH groups of the vinyl chloride-vinyl acetate-vinyl alcohol copolymer impregnated into nitrocellulose. The amount of the crosslinking agent is to react with OH groups of the special copolymer and other components. This can be determined by a person skilled in the art.

The conditions and the components which are well-known have not been recited in the specification, however, these can be selected by a person skilled in the art.

The present invention will be further illustrated by certain examples and references which are provided for purposes of illustration only and are not intended to be limiting the present invention.

PREPARATION OF NITROCELLULOSE IMPREGNATING VINYL CHLORIDE-VINYL ACETATE-VINYL ALCOHOL COPOLYMER

Commercial nitrocellulose usually impregnated with isopropyl alcohol.

Isopropyl alcohol was separated by evaporating from the commercial nitrocellulose impregnated isopropyl alcohol. Each vinyl chloride-vinyl acetate-vinyl alcohol copolymer (content of vinyl alcohol component of 8%, 10% or 12%) was impregnated into the resulting nitrocellulose (non-solvent) by kneading them in a ball mill to obtain nitrocellulose plasticized with the vinyl chloride-vinyl acetate-vinyl alcohol copolymer.

PREPARATION OF MAGNETIC COATING COMPOSITION AND MAGNETIC RECORDING TAPE

Each mixture stated in the following examples and references was mixed in a ball mill for about 30 hours to disperse well and a polyisocyanate (Demsmodur L manufactured by Bayer Co.) was added as a thermal crosslinking agent to prepare each magnetic coating composition.

Each magnetic coating composition was coated on a substrate made of polyethyleneterephthalate. A surface processing treatment was carried out by a super-calendering method and the coated layer was cured by heating at 60° C. for 24 hours. The product was cut in a form of a magnetic recording tape. The product was tested for the evaluation.

As the reference, each magnetic recording tape was prepared by the same process except using (a) a vinyl chloride-vinyl acetate-vinyl alcohol copolymer(content of vinyl alcohol component of 60%) and nitrocellulose impregnating isopropyl alcohol or (b) nitrocellulose plasticized a vinyl chloride-vinyl acetate-vinyl alcohol copolymer (content of vinyl alcohol component of 6%) and each product was tested for the evaluation in Reference 1 and Reference 2.

Reference 1:

| | |
|---|---|
| $\gamma$-Fe$_2$O$_3$ magnetic powder (cobalt dope) | 120 wt. parts |
| Polyurethane resin (No. 5032 manufactured by Nippon Polyurethane K.K.) | 24 wt. parts |
| Nitrocellulose impregnated with isopropyl alcohol H½ sec. (manufactured by Asahi Kasei K.K.) | 13 wt. parts |
| VAGH (vinyl chloride-vinyl acetate-vinyl alcohol copolymer having vinyl alcohol component of 6%) (manufactured by Union Carbide Co.) | 3 wt. parts |
| Lubricant | 5 wt. parts |
| Methyl ethyl ketone | 100 wt. parts |
| Methyl isobutyl ketone | 100 wt. parts |
| Toluene | 100 wt. parts |

Reference 2:

| | |
|---|---|
| $\gamma$-Fe$_2$O$_3$ magnetic powder (cobalt dope) | 120 wt. parts |
| Polyurethane resin (No. 5032 manufactured by Nippon Polyurethane K.K.) | 24 wt. parts |
| Nitrocellulose impregnated with VAGH (vinyl chloride-vinyl acetate-vinyl alcohol copolymer having vinyl alcohol component of 6%) (Clear chips manufactured by Taisei Kako K.K.) | 16 wt. parts |
| Lubricant | 5 wt. parts |
| Methyl ethyl ketone | 100 wt. parts |
| Methyl isobutyl ketone | 100 wt. parts |
| Toluene | 100 wt. parts |

(polyurethane resin No. 5032: solid content of 44–46% viscosity 90,000–150,000 pale yellow transparent).

EXAMPLE 1:

| | |
|---|---|
| $\gamma$-Fe$_2$O$_3$ magnetic powder (cobalt dope) | 120 wt. parts |
| Polyurethane resin (No. 5032 manufactured by Nippon Polyurethane K.K.) | 24 wt. parts |
| Nitrocellulose impregnated with vinyl chloride-vinyl- acetate-vinyl alcohol copolymer having vinyl alcohol component of 8% | 16 wt. parts |
| Lubricant | 5 wt. parts |
| Methyl ethyl ketone | 100 wt. parts |
| Methyl isobutyl ketone | 100 wt. parts |
| Toluene | 100 wt. parts |

EXAMPLE 2:

| | |
|---|---|
| $\gamma$-Fe$_2$O$_3$ magnetic powder (cobalt dope) | 120 wt. parts |
| Polyurethane resin (No. 5032 manufactured by Nippon Polyurethane K.K.) | 24 wt. parts |
| Nitrocellulose impregnated with vinyl chloride-vinyl acetate-vinyl alcohol copolymer having vinyl alcohol component of 10% (manufactured by Denki Kagaku K.K.) | 16 wt. parts |
| Lubricant | 5 wt. parts |
| Methyl ethyl ketone | 100 wt. parts |
| Methyl isobutyl ketone | 100 wt. parts |
| Toluene | 100 wt. parts |

EXAMPLE 3:

| | |
|---|---|
| $\gamma$-Fe$_2$O$_3$ magnetic powder (cobalt dope) | 120 wt. parts |
| Polyurethane resin (No. 5032 manufactured by Nippon Polyurethane K.K.) | 24 wt. parts |
| Nitrocellulose impregnated with vinyl chloride-vinyl acetate-vinyl alcohol copolymer having vinyl alcohol component of 12% (manufactured by Denki Kagaku K.K.) | 16 wt. parts |
| Lubricant | 5 wt. parts |
| Methyl ethyl ketone | 100 wt. parts |
| Methyl isobutyl ketone | 100 wt. parts |

| | |
|---|---|
| -continued | |
| Toluene | 100 wt. parts |

The magnetic recording media prepared by the processes of Examples 1, 2 and 3 and References 1 and 2 were tested to evaluate gloss degree and electric characteristics.

FIG. 1 is a graph plotting gloss degrees to contents of vinyl alcohol component (wt.%).

When the content of vinyl alcohol component was 6 wt.%, the gloss degree was substantially the same as that of no impregnation.

On the other hand, when the content of vinyl alcohol component was 8 wt.% or more, the gloss degree was improved. When it was 12 wt.%, the gloss degree was improved for about 3 dB then that of the content of vinyl alcohol component of 6 wt.%.

Figure 2:
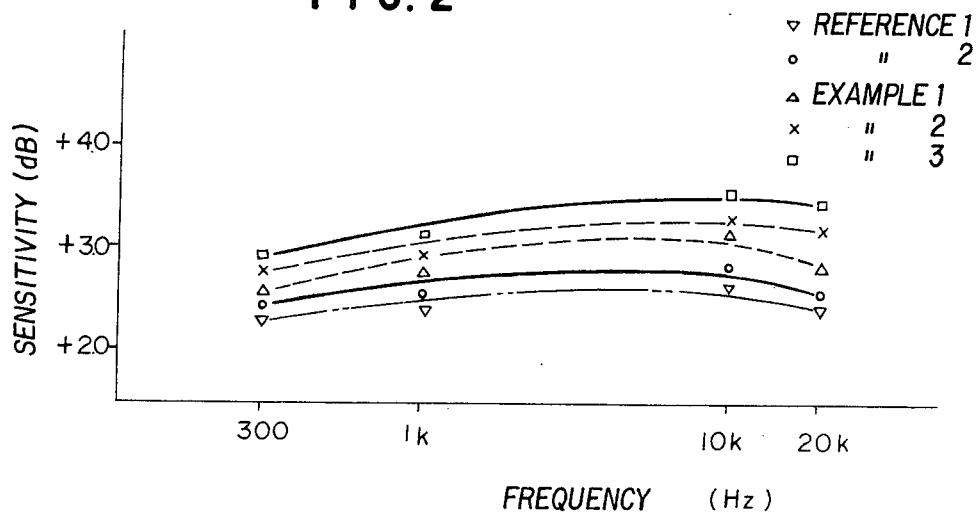
FIG. 2 is a graph showing the relation of contents of vinyl alcohol components and electric characteristics.

FIG. 2 shows frequency characteristics of sensitivities. The sensitivities are improved in the order of References 1 and 2, and Examples 1, 2 and 3 in the whole frequency.

The results of the tests show that the magnetic recording media having improved characteristics can be obtained by using nitrocellulose impregnated with vinyl chloride-vinyl acetate-vinyl alcohol copolymer having a content of vinyl alcohol component of 8 wt.% or more.

What is claimed is:

1. A magnetic recording medium useful as a magnetic coating composition prepared by a process, comprising:
   removing alcohol from an alcohol impregnated nitrocellulose composition;
   impregnating said alcohol free nitrocellulose with a vinyl chloride-vinylacetate-vinylalcohol copolymer having a vinyl alcohol content of at least 8 wt.%;
   blending a magnetic powder, a cross-linkable polymer and a solvent with the impregnated nitrocellulose; and
   adding a cross-linking agent to said blended mixture.

2. The magnetic recording medium of claim 1, wherein said cross-linkable polymer is a polyurethane.

3. The magnetic recording medium of claim 1, wherein said cross-linkable polymer is a polyester.

4. The magnetic recording medium of claims 1, 2 or 3 wherein said cross-linking agent is a polyisocyanate.

5. The magnetic recording medium of claim 1, wherein the content of said vinylalcohol component in said copolymer is in the range of 8 to 30 wt.%.

6. The magnetic recording medium of claim 1, wherein the weight ratio of nitrocellulose to the mixture of nitrocellulose and said copolymer is in the range of 0.05 to 0.8.

* * * * *